United States Patent
Ono

(10) Patent No.: US 6,728,222 B1
(45) Date of Patent: Apr. 27, 2004

(54) CONFERENCE TERMINAL CONTROL DEVICE

(75) Inventor: Yoshihiro Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/451,841

(22) Filed: Dec. 1, 1999

(30) Foreign Application Priority Data

Dec. 8, 1998 (JP) .......................................... 10-348835

(51) Int. Cl.[7] .............................................. H04L 12/16
(52) U.S. Cl. .................................. 370/260; 379/202.01
(58) Field of Search ................................ 370/260, 263, 370/265, 267, 268; 348/14.08, 14.13; 379/112.04, 158, 202.01

(56) References Cited

U.S. PATENT DOCUMENTS

| 5,390,177 A | * | 2/1995 | Nahumi ....................... 370/268 |
| 5,953,050 A | * | 9/1999 | Kamata et al. ............. 348/14.09 |
| 6,205,124 B1 | * | 3/2001 | Hamdi ......................... 370/260 |

FOREIGN PATENT DOCUMENTS

| JP | 7-95300 | 4/1995 |
| JP | 7-226930 | 8/1995 |
| JP | 8-149411 | 6/1996 |
| JP | 8-149439 | 6/1996 |
| JP | 2661567 | 6/1997 |

OTHER PUBLICATIONS

Japanese Office Action, dated Feb. 29, 2000, with English language translation of Japanese Examiner's comments.

* cited by examiner

*Primary Examiner*—Chau Nguyen
*Assistant Examiner*—Andy Lee
(74) *Attorney, Agent, or Firm*—Whitham, Curtis & Christofferson, P.C.

(57) ABSTRACT

A multi-point control unit (MCU) for a multi-point connected conference system is disclosed in which to attain low power consumption and enhance sound quality, when a speaker detection circuit 4 judges that the number of conference terminals having transmitted a voiced compressed code is one, a first selector 6 directly transmits compressed voice to a second selector 16 without decoding the voice, and the second selector 16 outputs the compressed voice to a distribution circuit 18. Thereby, since a voice signal is transmitted to the conference terminal without passing through a decoder 8, and the like, the power necessary for a processing is reduced, and the deterioration of sound quality by the voice processing, and the like are prevented from occurring.

15 Claims, 7 Drawing Sheets

CONFERENCE TERMINAL CONTROL DEVICE

BACKGROUND OF THE INVENTION

1. Field of the Invention

The present invention relates to a multi-point connected conference system for use when a plurality of remote conference rooms are connected to perform conference, and the like, particularly to the voice control of a conference terminal control device.

2. Description of the Prior Arts

A remote conference system for exchanging voice information among a plurality of terminals installed in remote locations has heretofore been known, and FIG. 1 shows a constitution block diagram of a multi-point control unit (hereinafter referred to as MCU) as one example of such conference terminal control device disclosed in Japanese Patent Application Laid-Open No. 149441/1996.

As shown in FIG. 1, MCU 100 comprises a demultiplexer (shown as DEMUX) 2 for separating voice information transmitted from any of conference terminals 30A(1) to 30A(m) installed in remote locations into a compressed voice code and a voiced/unvoiced code, a speaker detection circuit 4 for detecting a speaker based on the voiced/unvoiced code of each terminal, a first selector 6 for selecting only the voiced code from the compressed voice codes from any of the conference terminals 30A(1) to 30A(m), a decoder 8 for decoding the compressed voice code selected by the first selector 6, an attenuation circuit 10 for adjusting a decoded voice level, a synthesizing circuit 12 for synthesizing an output voice signal of the attenuation circuit 10, an encoder 14 for compressing the synthesized voice signal, a distribution circuit 18 for distributing the compressed voice code and other outputs of the encoder 14 to all conference terminals 30B(1) to 30B(m), and other components. Here, n decoders 8 and n attenuation circuits 10 are provided for m conference terminals in which there is a relation of m≧n. The demultiplexer 2 comprises m demultiplexers 2(1) to 2(m), the decoder 8 comprises n decoders 8(1) to 8(n), and the attenuation circuit 10 comprises n attenuation circuits 10(1) to 10(n).

In MCU 100, upon receiving the voice information from any one of the conference terminals 30A(1) to 30A(m), the speaker detection circuit 4 judges the compressed voice code from which one of the conference terminals is voiced information on the voiced/unvoiced code separated by the DEMUX 2, and the first selector 6 selects the conference terminal according to the judgment result, and supplies the compressed voice code of the conference terminal to the decoder 8.

For example, when it is judged that the conference terminals 30A(1) and 30A(3) are voiced among all the conference terminals 30A(1) to 30A(m), the first selector 6 supplies the compressed voice codes from the conference terminals 30A(1) and 30A(3) to the decoders 8(1) and 8(2), respectively.

Subsequently, the decoder 8 decodes the compressed voice code to generate a voice signal, and the attenuation circuit 10 adjusts the level of the voice signal, and transmits the signal to the synthesizing circuit 12. The synthesizing circuit 12 adds/synthesizes a plurality of voice signals from the attenuation circuits 10(1) to 10(n), and transmits the signal to the encoder 14. The encoder compresses the synthesized voice signal and transmits the signal to the distribution circuit 18. The distribution circuit 18 transmits the compressed voice signals to all of m conference terminals 30B(1) to 30B(m).

In the conference using the above-described conference terminals, a state in which there is only one speaker is frequently generated. Even in such a state, the MCU 100 detects the conference terminal, passes the speaking through the decoder 8, the attenuation circuit 10, synthesizing circuit 12, and the following circuits, and performs the voice decoding, level adjustment, voice compression processing, and so on for speaking during the conference.

However, such voice processing is necessary only when speech inputs from a plurality of conference terminals are simultaneously generated, and are essentially unnecessary when only one person speaks. Therefore, for only one speaker, the decoding, attenuating and other processes waste power. Moreover, since the compressed voice is decoded, and the decoded voice is compressed again and distributed to the conference terminals, the sound quality transmitted to each conference terminal is deteriorated in some cases.

SUMMARY OF THE INVENTION

An object of the present invention is to provide a conference terminal control device which simplifies a procedure of a voice processing, reduces power consumption necessary for the processing, and enhances a sound quality to present easily audible voices in a conference.

According to the present invention, to solve the above-described problems, the conference terminal control device is constituted as follows:

Specifically, when the number of voiced conference terminals is one, or equal to or less than a predetermined number, synthesis processes of a compressed voice code from the conference terminal which are usually performed, that is, decoding, attenuating, synthesizing, compression, and so on are omitted, and the code is directly transmitted to each conference terminal. This can reduce redundant decoding/compression processes, and can prevent wasteful power consumption and processing, and sound quality deterioration.

Specifically, a voiced or unvoiced code is attached to the voice code from the conference terminal, and the conference control terminal control device reads this voiced or unvoiced code from the voice code from the conference terminal to detect the voiced conference terminals and measure the number of voiced conference terminals. If the number is two or more than a predetermined number, then the voice code from the conference terminal is passed through a decoder, an attenuation circuit, a synthesizing circuit, and so on to process, synthesize, code and distribute the voice code of each conference terminal to each of the conference terminals in the same manner as in the conventional art. On the other hand, if there is only one or less than the predetermined number of the conference terminals, then, the voice code from the conference terminal is directly transmitted to the distribution circuit and distributed to the conference terminals without passing through the processing processes.

Therefore, there is provided a conference terminal control device, comprising conference terminals installed in a plurality of locations, a decoder for decoding compressed voice codes from the conference terminals, attenuation circuits for adjusting decoded voice levels outputted by the decoders, a synthesizing circuit for adding/synthesizing output voice signals of the attenuation circuits, an encoder for compressing a voice signal outputted by the synthesizing circuit, and a distribution circuit for distributing a compressed voice code to the conference terminals so that the conference terminals are interconnected, characterized in that a multipoint control device comprises a demultiplexer for separating voice information from any of the conference terminals into the compressed voice code and a voiced/unvoiced code; a speaker detection circuit for detecting whether the compressed voice code is voiced or unvoiced based on the voiced/unvoiced code and measuring the number of voiced conference terminals; a first selector for, when the measured number of voiced conference terminals from the speaker detection circuit is more than a predetermined number, connecting the detected voiced conference terminal to the decoder and for, when the measured number is equal to or less than the predetermined number, connecting the detected voiced conference terminal to a second selector; and the second selector for, when the measured number is more than the predetermined number, selecting the encoder, for, when the measured number is equal to or less than the predetermined number, selecting the first selector, and for outputting the compressed voice code from either one of the selected encoder to the distribution circuit.

When the number of voiced conference terminals determined by the speaker detection circuit is one, or equal to or less than the predetermined number, the first selector selects the connection with the second selector, and transmits the compressed voice code from the conference terminal to the second selector. The second selector selects the connection with the first selector, and transmits the compressed voice code directly transmitted from the first selector to the distribution circuit, and the compressed voice codes are distributed to the conference terminals.

On the other hand, when the number of voiced conference terminals determined by the speaker detection circuit is two, or more than the predetermined number, the first selector selects the connection to the decoder, and connects the voiced conference terminal to the decoder. The second selector selects the connection with the encoder. Thereby, the compressed voice code from the voiced conference terminal is transmitted to the decoder, decoded in the decoder, and attenuated to have a predetermined value by the attenuation circuit. The voice signals are synthesized by the synthesizing circuit. Subsequently, the signal, after being encoded by the encoder, is transmitted to the distribution circuit via the second selector. The distribution circuit transmits the codes to each conference terminal.

As described above, when the number of speakers is one, or equal to or less than the predetermined number, the compressed voice code is directly distributed to each conference terminal. Therefore, a wasteful processing is not performed midway, and deterioration of sound quality and other disadvantages by the processing are not caused.

DETAILED DESCRIPTION OF THE PREFERRED EMBODIMENTS

The present invention will now be described in detail with reference to the drawings.

Figure 1:
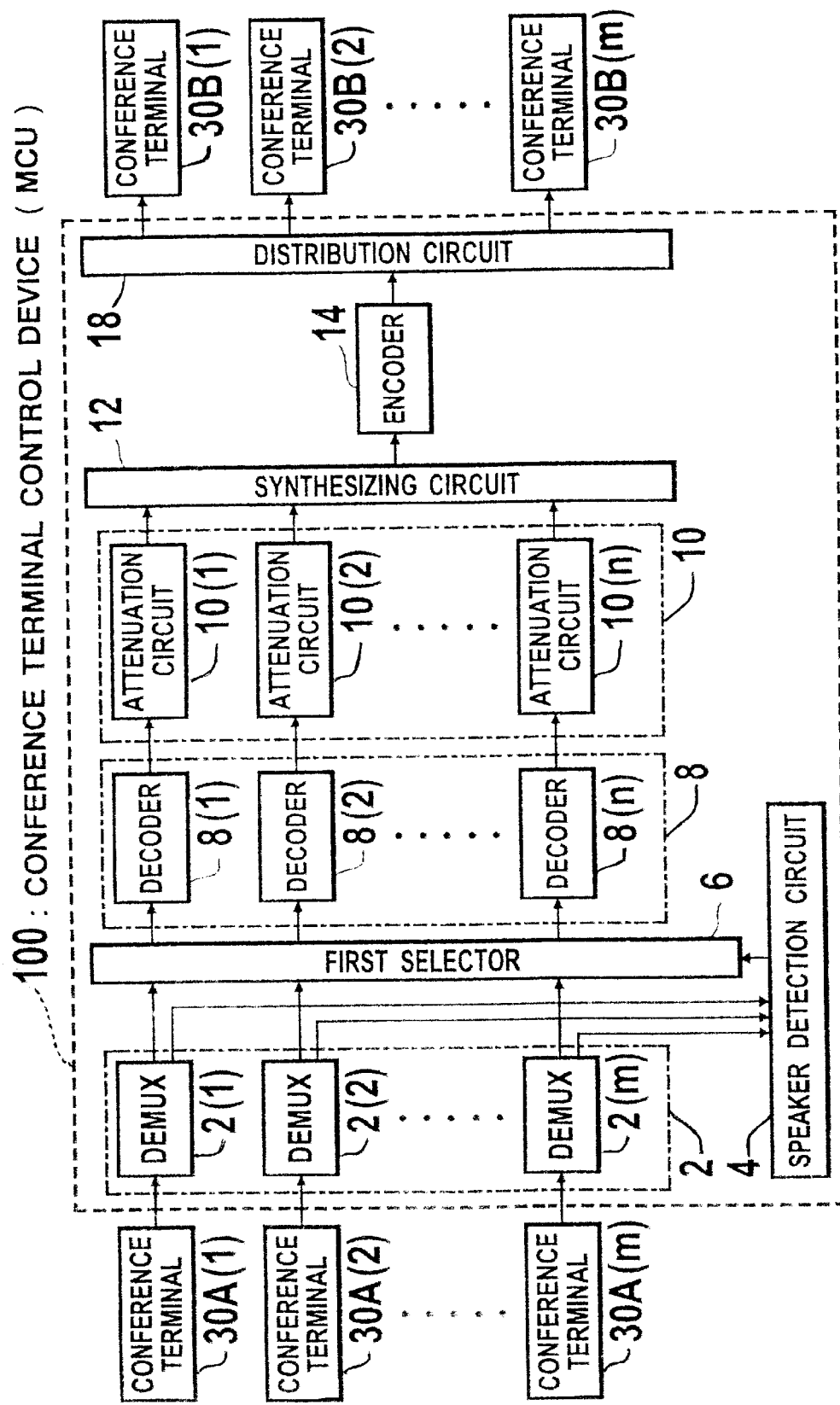
FIG. 1 shows a block diagram of a conventional conference terminal control device.
Figure 2:
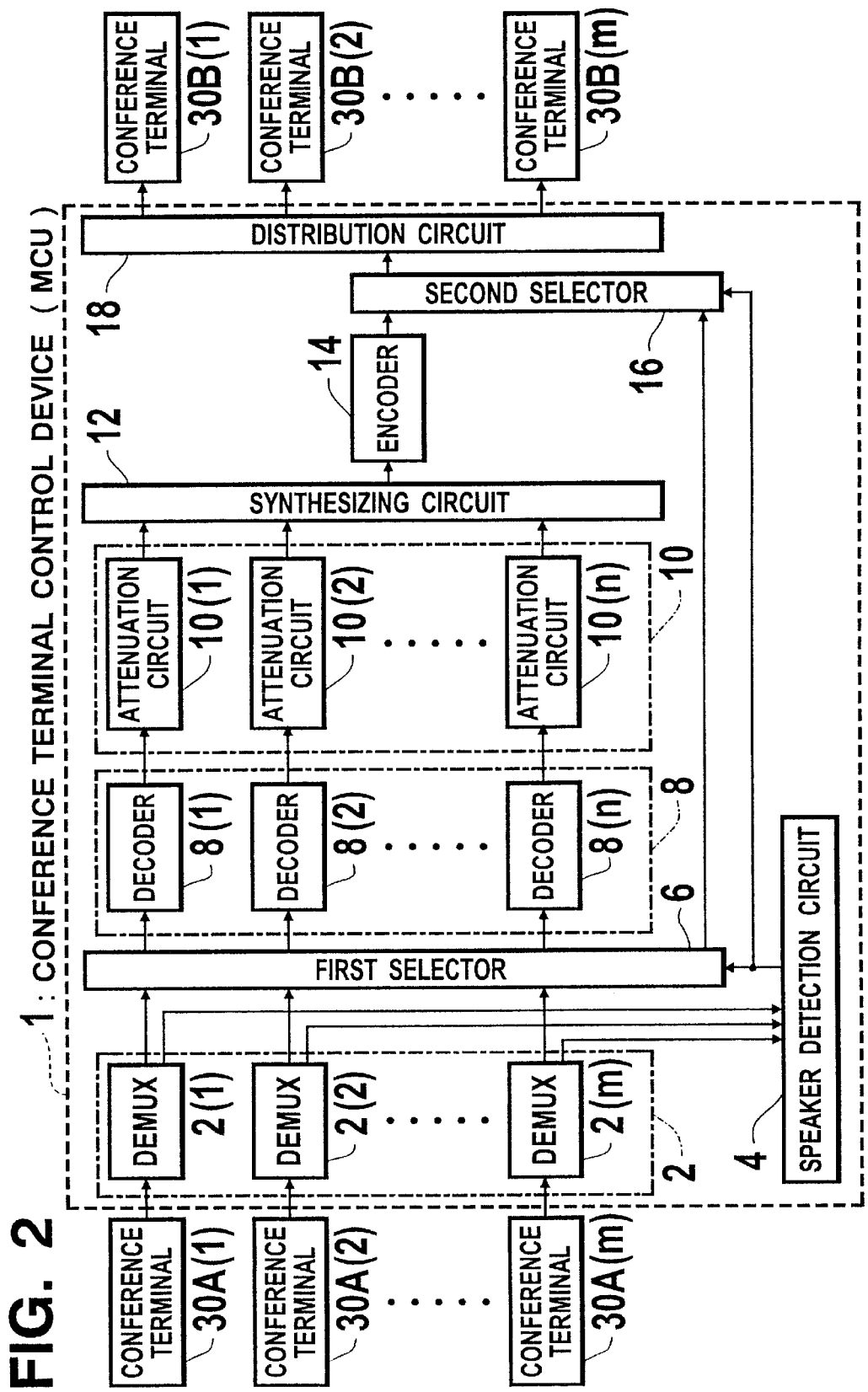
FIG. 2 shows a block diagram of one embodiment of the conference terminal control device according to the present invention.

FIG. 2 shows a block diagram of the conference terminal control device according to the present invention. In FIG. 2, the same components as those of the conventional example shown in FIG. 1 are denoted with the same reference numerals.

Figure 3:
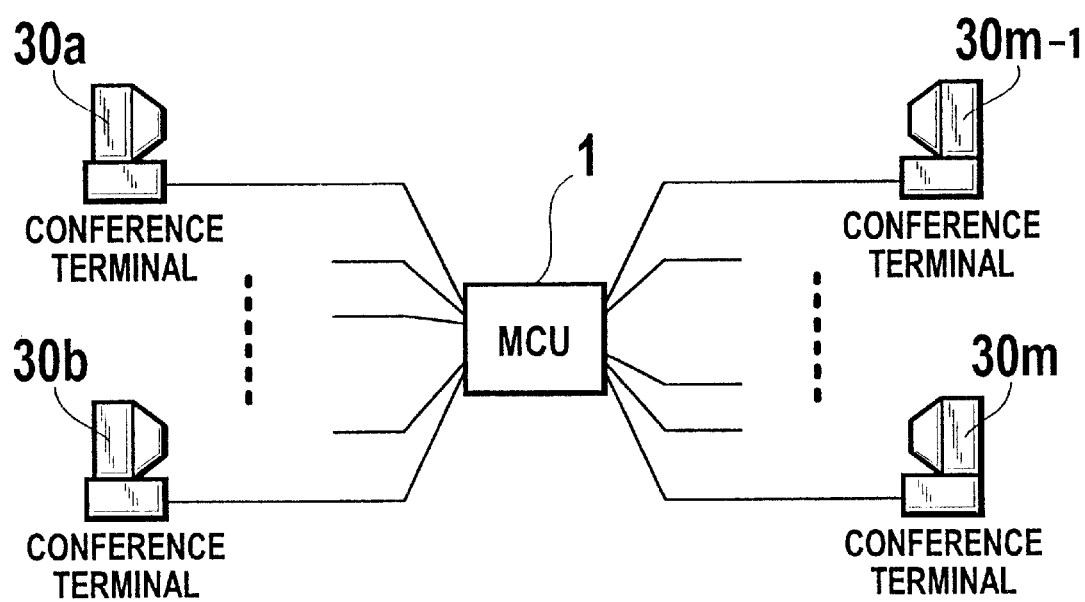
FIG. 3 is a diagram showing a conference system.

As shown in FIG. 3, MCU 1 is connected to a plurality of conference terminals 30a to 30m installed in remote locations to receive image and/or voice signals from any of the conference terminals and to distribute the signals to each conference terminal.

Referring again to FIG. 2, the MCU 1 comprises a demultiplexer (DEMUX) 2, a speaker detection circuit 4 for detecting whether the voice from any of the conference terminals 30A(1) to 30A(m) is voiced or unvoiced, a first selector 6 for switching the connection of each conference terminal to a decoder 8 or a second selector 16, a decoder 8 connected to the first selector 6 to decode a compressed voice code, an attenuation circuit 10 connected to the decoder 8 for adjusting the level of a decoded voice, a synthesizing circuit 12 for synthesizing an output voice signal from the attenuation circuit 10, an encoder 14 for compressing the synthesized voice signal, the second selector 16 for switching the connection to either the encoder 14 or the first selector 6 to transmit the voice code to a distribution circuit, a distribution circuit 18 for distributing the compressed voice codes from the second selector 16 to all of conference terminals 30B(1) to 30B(m), and other elements. Here, the number m of conference terminals is larger than the number n of the decoders 8 and the attenuation circuits 10.

Figure 7:
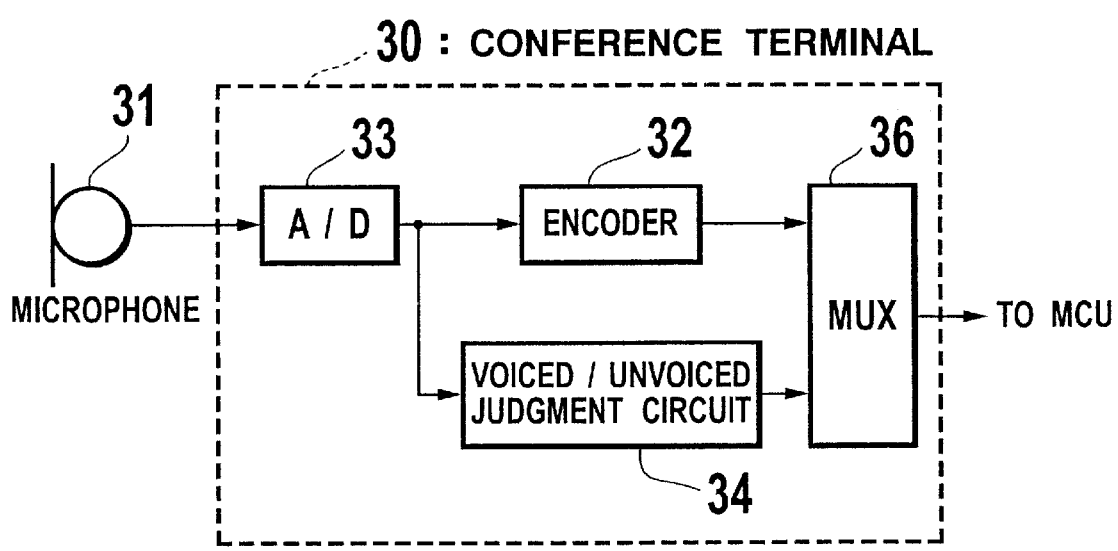
FIG. 7 shows a block diagram of an example of a conference terminal according to the present invention.

A circuit constitution of conference terminal 30 is shown in FIG. 7. Each conference terminal 30 comprises a microphone 31, an A/D converter 33, an encoder 32 for converting speaker's voice to the compressed voice code, a voiced/unvoiced judgment circuit 34 for judging whether or not the speaker makes a speech, and a multiplexer (shown as MUX) 36 for multiplexing the compressed voice code and the voiced/unvoiced code. The voice information obtained by multiplexing the voiced/unvoiced code to the encoded voice signal is transmitted to the MCU 1.

In the same manner as the conventional example, DEMUX 2 comprises m DEMUX 2(1) to 2(m) connected to the conference terminals 30A(1) to 30A(m), respectively, separates the voice information transmitted from each conference terminal to the compressed voice code and the voiced/unvoiced code, and transmits the compressed voice code to the first selector 6 and the voiced/unvoiced code to the speaker detection circuit 4.

Upon receiving a voiced/unvoiced signal from the DEMUX 2, the speaker detection circuit 4 judges whether the voice code of the conference terminal includes voice and determines the conference terminal from the voiced/unvoiced signal, measures the number of voiced conference terminals, and transmits the result to the first selector 6 and the second selector 16.

The first selector 6 is connected to all the decoders 8 via selector switches (not shown), and appropriately connects each of the decoders 8 to the conference terminal. Moreover, the first selector 6 has a direct connection line extended to the second selector 16 separately from the connection line to the decoder 8. When it is notified from the speaker detection circuit 4 that the number of voiced conference terminals (i.e., the number of speakers) is one, the voiced conference terminal is directly connected to the second selector 16 via the connection line without passing,through the decoder 8.

The decoder 8 which is constituted of m decoders 8(1) to 8(m) to decodes the voice code. When any of the conference terminal is connected via the first selector 6, the encoded voice code from the conference terminal is decoded and transmitted to the attenuation circuit 10. The attenuation circuit 10 is constituted of attenuation circuits 10(1) to 10(n) to attenuate a voice output. When the voice signals from the conference terminals are synthesized by the synthesizing circuit 12, the circuit 10 appropriately attenuates the voice output so that the output of the synthesized voice signal is prevented from being excessively large. The attenuation amount of the voice signal in the attenuation circuit 10 changes in accordance with the sound volume of the inputted voice signal, and is set to a predetermined value. The predetermined value is set on the assumption that even when the voice signals from four or five conference terminals are synthesized, the output after the synthesis usually fails to become excessively large. Additionally, the reference number of conference terminals is not limited to this. However, even when the voices of a multiplicity of conference terminals are synthesized, individual conference terminal outputs are reduced, or the number of terminals becomes too much. Therefore, it is difficult to recognize the voice at each conference terminal.

The synthesizing circuit 12 synthesizes the voice signal transmitted from the attenuation circuit 10, and transmits the signal to the encoder 14. The encoder 14 encodes the synthesized voice signal, and transmits the code to the second selector 16.

The second selector 16 is connected to the encoder 14, first selector 6, and distribution circuit 18, and receives a speaker number signal from the speaker detection circuit 4. When the speaker number signal indicates the number of speakers of two or more, the encoder 14 is connected to the distribution circuit 18, and the voice code from the encoder 14 is transmitted to the distribution circuit 18. On the other hand, when the speaker number signal indicates the number of speakers being one, the first selector 6 is connected to the distribution circuit 18 to transmit the voice code from the first selector 6 to the distribution circuit 18.

The distribution circuit 18 is connected to input sections of all conference terminals 30B(1) to 30B(m), and distributes/transmits the voice code from the second selector 16 to all the conference terminals 30B(1) to 30B(m).

Figure 4:
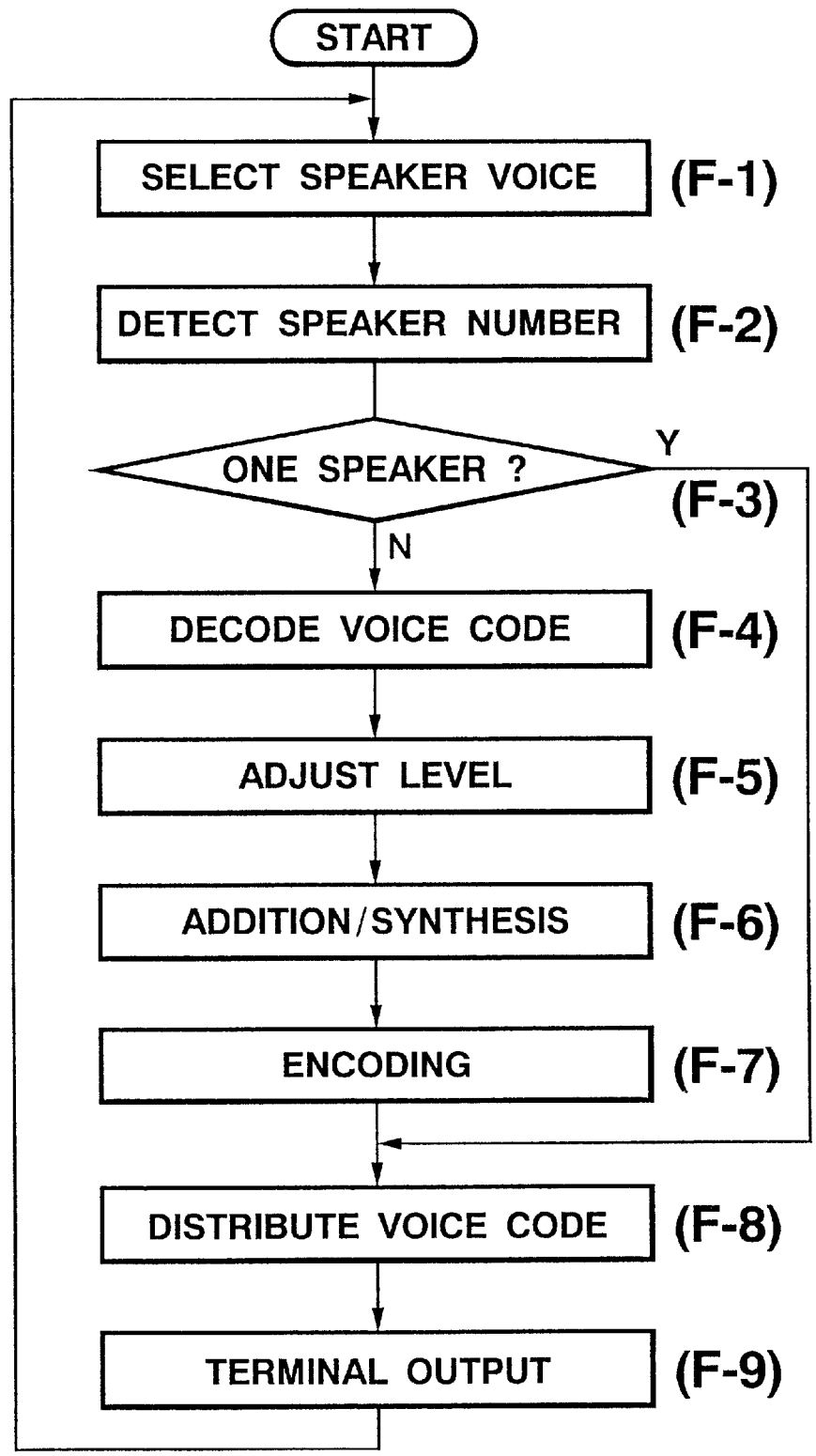
FIG. 4 shows a flowchart of the control of the conference terminal control device of the present invention.

The operation of the conference terminal control device 1 will be described with reference to FIG. 4.

Referring to FIG. 7, in the conference terminals 30A(1) to 30A(m), when the speaker speaks to the microphone 31, the speaker's voice is converted to the compressed voice code by the encoder 32 and the voiced/unvoiced code indicating whether the speaker issues a voice is simultaneously generated in the voiced/unvoiced judgment circuit 34. Both codes are multiplexed by MUX 36, and transmitted as the voice information to the MCU 1.

In the MCU 1, upon receiving the voice information from any of the conference terminals 30A(1) to 30A(m), the DEMUX 2 separates the voiced/unvoiced signal, and the speaker detection circuit 4 uses the voiced/unvoiced signal to judge whether the compressed voice code of the conference terminal is voiced and determine the corresponding conference terminal (F-1). Then, the number of voiced conference terminals is measured (F-2).

After determining that the code is voiced/unvoiced, the information is transmitted to the first selector 6 which operates as follows in accordance with the number of voiced conference terminals (F-3).

First, when there are two or more voiced conference terminals, the first selector 6 selects the voiced conference terminals, connects the voiced conference terminals to the decoder 8 in a state of one to one, and transmits the voice codes to the decoder 8. Each of the decoders 8(1) to 8(n) decodes the supplied compressed voice code to generate the voice signal (F-4), and the generated voice signal is attenuated to provide a predetermined level by the attenuation circuit 10 (F-5).

The attenuation circuit 10 performs the level adjustment of each voice signal, and the level-adjusted voice signals are synthesized by the synthesizing circuit 12 (F-6). Specifically, the voices from the voiced conference terminals are all collected. Then, the voices are encoded by the encoder 14 (F-7), transmitted to the second selector 16 and transmitted to all the conference terminals 30B(1) to 30B(m) via the distribution circuit 18 (F-8).

On the other hand, when the number of voiced conference terminals is one (F-3), this information is transmitted to the first selector 6. The first selector 6 selects the voiced conference terminal and connects this voiced conference terminal to the second selector 16. The voice code of the conference terminal directly connected to the second selector 16 is transmitted to the distribution circuit 18 as it is (F-8), and transmitted to all the conference terminals 30B(1) to 30B(m) from the distribution circuit 18.

The voice code transmitted to each of the conference terminals 30B(1) to 30B(m) is converted to voice by each conference terminal, and the voice is emitted via a speaker, an earphone (not shown), or the like (F-9).

As described above, when a conference terminal is the only one voiced, the voice code from the conference terminal 30A is distributed to all the conference terminals 30B without performing processes such as attenuation. Therefore, no wasteful processing is carried out. Furthermore, since the code is directly transmitted, the deterioration of sound quality can be prevented.

The application of the embodiment of MCU of the present invention to ITU-T H.324 television conference system will be described.

In the ITU-T H.324 television conference system, ITU-T G.723.1 is used for voice encoding. Additionally, since the constitutional characteristic peculiar to the embodiment is the same as that of the above embodiment, the operation of the embodiment will be described by reference to FIG. 2.

Each of the television conference terminals 30A(1) to 30A(m) frames the speaker's voice signal each 30 msec, and compresses the signal for each frame for transmission to the MCU 1. In this voice encoding, the voiced/unvoiced information is recorded in a top byte of the compressed code. The MCU 1 receives the compressed code from each of the television conference terminals 30A(1) to 30A(m), and the DEMUX 2 supplies the top byte of the compressed code to the speaker detection circuit 4. The speaker detection circuit 4 evaluates the compressed code top byte from all the television conference terminals 30A(1) to 30A(m), and notifies the terminal number which has transmitted the compressed codes indicating the voiced frames, and the number of the terminals to the first selector 6. Additionally, the number of the terminals which have transmitted the compressed code indicating the voiced frame is notified to the second selector 16.

When the notified number of terminals is one, the first selector 6 transmits the compressed code of the conference terminal having the notified terminal number to the second selector 16. When the notified number of terminals is two or more, the compressed codes of the notified terminal numbers are transmitted to the decoder 8. The compressed code transmitted to the decoder 8 is successively transmitted to the attenuation circuit 10, synthesizing circuit 12 and encoder 14, in which the decoding, level adjustment and synthesizing/compression of the compressed code are performed, and is transmitted to the second selector 16. On the other hand, when the notified number of terminals from the speaker detection circuit 4 is one, a section comprising the decoder 8, attenuation circuit 10, synthesizing circuit 12 and encoder 14 is halted without operating, and the compressed code of the terminal number is transmitted to the second selector 16.

When the notified number of terminals from the speaker detection circuit 4 is one, the second selector 16 outputs the compressed code directly inputted from the first selector 6. When the notified number of terminals is two or more, the compressed codes inputted from the encoder 14 are outputted. The operation of the speaker detection circuit 4, first selector 6 and second selector 16 is switched every 30 msec which is a frame timing of voice encoding.

Moreover, the operation of the attenuation circuit will be described.

When the sound volume level differs with each conference terminal, to equalize the sound volume level, the signal amplitude is normalized for each voice from the conference terminal. As an example of normalization, when an attenuation circuit input is expressed by x(i), the amplitude can be obtained by x(i)/Ex(i), in which Ex(i) is an estimated value of signal amplitude level as follows:

$$Ex(i)=\delta|x(i)|+(1-\delta)Ex(i-1) \text{(for } |x(i)|<Ex(i-1))$$

$$Ex(i)=|x(i)| \text{(for } |x(i)|\geq Ex(i-1))$$

where δ denotes a minute coefficient of 1 or less and i is a time index.

The voice signal obtained in this manner is attenuated to have a predetermined value by the attenuation circuit. The attenuation amount is determined based on the number of conference terminals. For example, 1/m results (m being the number of conference terminals). Thereby, even when there is a difference in voice signal level between the conference terminals, the level can be uniformed, so that an easily audible voice can be generated.

Another embodiment will be described.

Figure 5:
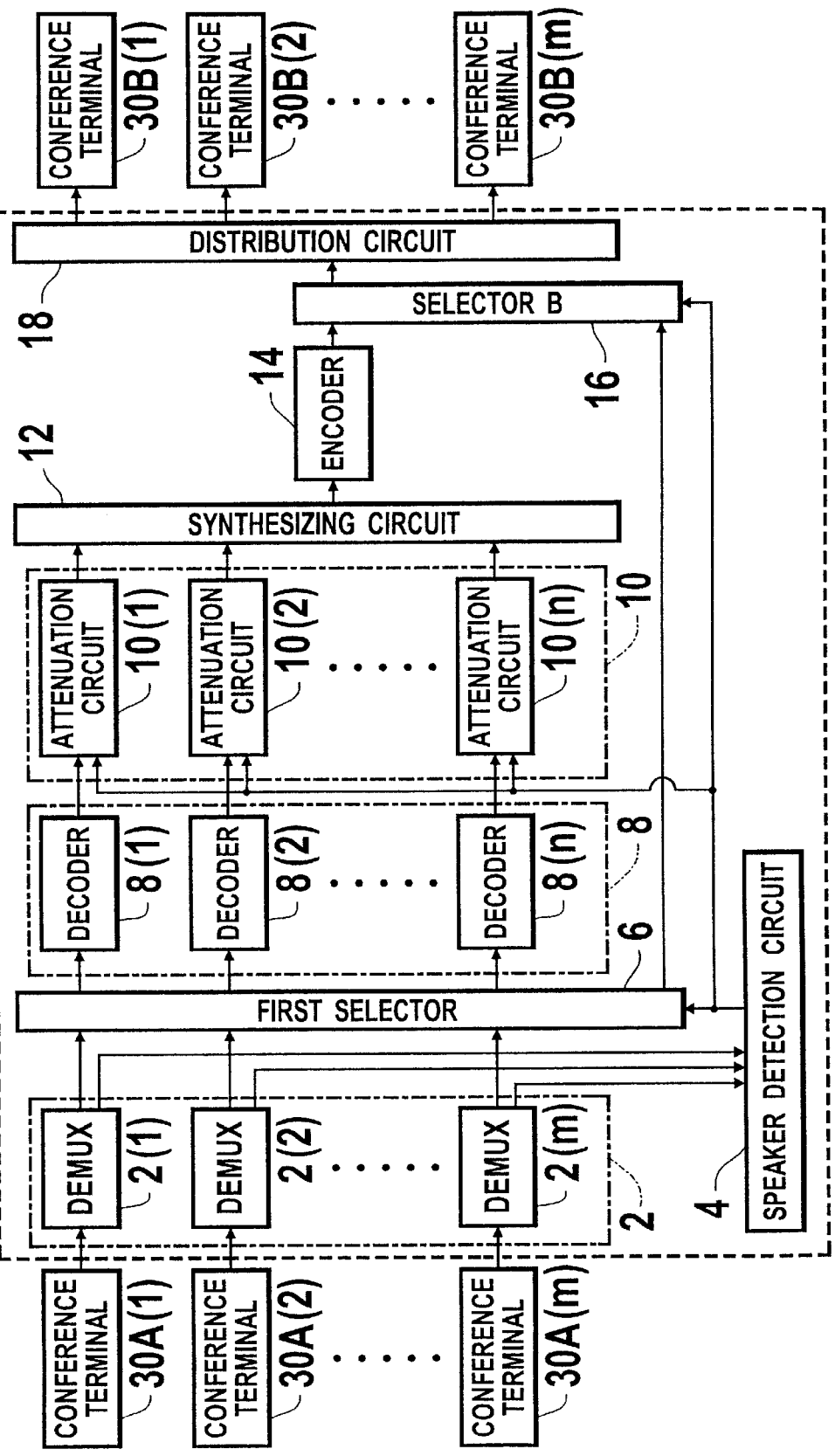
FIG. 5 shows a block diagram of another embodiment of the conference terminal control device according to the present invention.

In the embodiment as shown in FIG. 5, the attenuation circuit 10 is connected to the speaker detection circuit 4, and the number of speakers detected by the speaker detection circuit 4 is transmitted to the attenuation circuits 10(1) to 10(n). Each of the attenuation circuits 10(1) to 10(n) adjusts the attenuation amount in accordance with the number of speakers, and transmits the voice signal to the synthesizing circuit 12. Since the other circuit constitutions are the same as those of the first embodiment shown in FIG. 2, the description thereof is omitted.

It is considered that both a case in which one speaker is in the conference and a case in which a plurality of speakers are in the conference are frequently generated. If a difference in the sound volume is large between these cases, the sound volume largely fluctuates for each switching, and it becomes very difficult to hear the conference voice. Specifically, for one speaker, the voice signal from the conference terminal 30A is directly transmitted to the conference terminal 30B without passing through the attenuation circuit 10. For a plurality of speakers, the voice is processed and synthesized in the attenuation circuit 10 and other circuits. Therefore, when both cases are not correlated, a large difference is caused in the voices emitted from the conference terminals.

Therefore, to solve such disadvantages, the attenuation performed when a plurality of speakers exist is matched with a state which would be transmitted to the conference terminal 30B for one speaker. For example, for two speakers, the attenuation amount is adjusted so that the output value obtained by synthesizing both speaker's speeches agrees with that of one speaker. Moreover, for three speakers, adjustment is made so that the synthesized sound volume of three speakers agrees with the sound volume of one speaker. In this case, the adjustment may be made so that the sound volume of each speaker is equalized.

The attenuation amount is determined based on the number of voiced conference terminals. For example, 1/M results (M denotes the number of voiced conference terminals). Here, M dynamically changes.

Thereby, since the attenuation circuit 10 changes the attenuation amount in accordance with the number of speakers received from the speaker detection circuit 4, the easily audible voice can be outputted.

Figure 6:
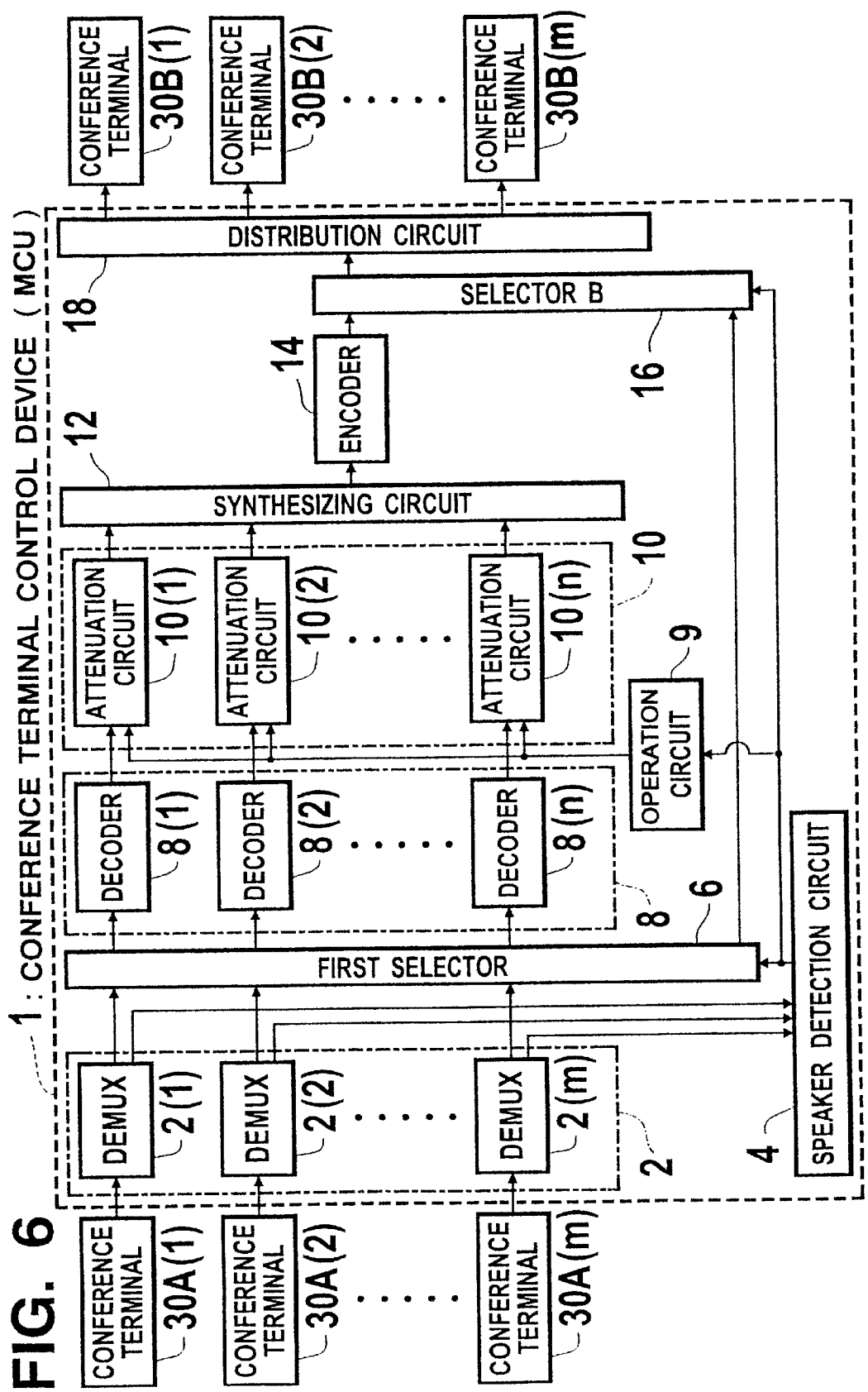
FIG. 6 shows a block diagram of still another embodiment of the conference terminal control device according to the present invention.

FIG. 6 shows still another embodiment of the present invention.

In the embodiment, an operation circuit 9 is disposed between the attenuation circuit 10 and the speaker detection circuit 4. The speaker number signal from the speaker detection circuit 4 is transmitted to the operation circuit 9, and the attenuation amount in each of the attenuation circuits 10(1) to 10(n) is calculated in accordance with the number of voiced conference terminals so that the amount may be transmitted. In this constitution, the attenuation circuits 10(1) to 10(n) can be controlled together.

Moreover, the attenuation circuit may be interposed for attenuation midway in a circuit for one speaker.

For a first effect, when the voiced compressed voice is received only from one, or the predetermined number or less number of conference terminals, each operation of voice decoding, level adjustment, voice addition, and voice decoding is halted, so that the low power consumption of MCU is realized.

This is because when the voiced compressed voice is transmitted from one conference terminal, the received compressed voice is transmitted to all terminals as it is.

A second effect is that the sound quality is enhanced.

This is because when only one speaker is considered to occupy a relatively long time section during the conference, the decoding and re-compressing of the compressed voice are not carried out.

What is claimed is:

1. A conference terminal control device provided with conference terminals installed in a plurality of locations, a decoder for decoding compressed voice codes from said conference terminals, an attenuation circuit for adjusting decoded voice levels outputted by said decoder, a synthesizing circuit for adding/synthesizing output voice signals of said attenuation circuit, an encoder for compressing a voice signal outputted by said synthesizing circuit, and a distribution circuit for distributing compressed voice codes to said conference terminals so that the conference terminals are interconnected, the conference terminal control device comprising:

demultiplexers for separating voice information from said conference terminals into the compressed voice code and a voiced/unvoiced code;

a speaker detection circuit for detecting whether the compressed voice code is voiced or unvoiced based on said voiced/unvoiced code and measuring the number of voiced conference terminals;

a first selector for supplying the compressed voice codes from said detected voiced conference terminals to said decoder when the measured number of voiced conference terminals from said speaker detection circuit is larger than a predetermined number, and for supplying the compressed voice codes from the detected voiced conference terminals to a second selector when said measured number is equal to or less than the predetermined number; and the second selector for selecting said encoder when the measure number is larger than the predetermined number, for selecting said first selector when said measured number is equal to or less than the predetermined number, and for outputting the compressed voice code from either the selected encoder or first selector to said distribution circuit.

2. The conference terminal control device according to claim 1, wherein said predetermined number is one.

3. The conference terminal control device according to claim 1, wherein said conference terminal comprises and encoder for encoding voice and outputting the compressed voice code, a voiced/unvoiced judgment circuit for judging whether or not the voice is included in the encoded voice signal, and a multiplexer for multiplexing the judgment result of the voiced/unvoiced judgment circuit and said compressed voice code.

4. The conference terminal control device according to claim 1, wherein when the number of conference terminals equal to a predetermined upper limit number of speakers is connected, said attenuation circuit sets an attenuation amount so that sound volume obtained by synthesizing speech from the conference terminals is equal to or less than a predetermined value.

5. The conference terminal control device according to claim 1, wherein said attenuation circuit changes an attenuation amount in accordance with the number of speakers detected by said speaker detection circuit, and performs attenuation so that a sound volume of speech synthesized by said synthesizing circuit reaches a predetermined level.

6. The conference terminal control device according to claim 1, wherein said attenuation circuit averages decoded speech sound volumes of the conference terminals, and performs attenuation so that a sound volume of speech synthesized by said synthesizing circuit reaches a predetermined level.

7. The conference terminal control device according to claim 3, wherein when the number of conference terminals equal to a predetermined upper limit number of speakers is connected, said attenuation circuit sets an attenuation amount so that sound volume obtained by synthesizing speech from the conference terminals is equal to or less than a predetermined value.

8. The conference terminal control device according to claim 3, wherein said attenuation circuit changes an attenuation amount in accordance with the number of speakers detected by said speaker detection circuit, and performs attenuation so that a sound volume of speech synthesized by said synthesizing circuit reaches a predetermined level.

9. The conference terminal control device according to claim 3, wherein said attenuation circuit averages decoded speech sound volumes of the conference terminals, and performs attenuation so that a sound volume of speech synthesized by said synthesizing circuit reaches a predetermined level.

10. The conference terminal control device according to claim 2, wherein said conference terminal comprises and encoder for encoding voice and outputting the compressed voice code, a voiced/unvoiced judgment circuit for judging whether or not the voice is included in the encoded voice signal, and a multiplexer for multiplexing the judgment result of the voiced/unvoiced judgment circuit and said compressed voice code.

11. The conference terminal control device according to claim 2, wherein when the number of conference terminals equal to a predetermined upper limit number of speakers is connected, said attenuation circuit sets an attenuation amount so that sound volume obtained by synthesizing speech from the conference terminals is equal to or less than a predetermined value.

12. The conference terminal control device according to claim 2, wherein said attenuation circuit changes an attenuation amount in accordance with the number of speakers detected by said speaker detection circuit, and performs attenuation so that a sound volume of speech synthesized by said synthesizing circuit reaches a predetermined level.

13. The conference terminal control device according to claim 2, wherein said attenuation circuit averages decoded speech sound volumes of the conference terminals, and performs attenuation so that a sound volume of speech synthesized by said synthesizing circuit reaches a predetermined level.

14. The conference terminal control device according to claim 4, wherein said attenuation circuit averages decoded speech sound volumes of the conference terminals, and performs attenuation so that a sound volume of speech synthesized by said synthesizing circuit reaches a predetermined level.

15. The conference terminal control device according to claim 5, wherein said attenuation circuit averages decoded speech sound volumes of the conference terminals, and performs attenuation so that a sound volume of speech synthesized by said synthesizing circuit reaches a predetermined level.

* * * * *